United States Patent [19]

Sadan

[11] 4,140,747
[45] Feb. 20, 1979

[54] PROCESS FOR THE PRODUCTION OF POTASSIUM CHLORIDE AND MAGNESIUM CHLORIDE FROM CARNALLITE

[75] Inventor: Abraham Sadan, Herzelia Pituach, Israel

[73] Assignee: Israel Chemicals Ltd., Tel-Aviv, Israel

[21] Appl. No.: 844,136

[22] Filed: Oct. 20, 1977

[30] Foreign Application Priority Data

Nov. 9, 1976 [IL] Israel ........................ 50873

[51] Int. Cl.$^2$ ............. C01D 3/08; C01F 5/30
[52] U.S. Cl. ................... 423/163; 423/179; 423/203
[58] Field of Search .......... 423/158, 184, 163, 197, 423/179, 203; 23/297, 298, 302 R, 304

[56] References Cited

U.S. PATENT DOCUMENTS

| | | | |
|---|---|---|---|
| 1,304,097 | 5/1919 | Reeve | 423/197 |
| 1,757,592 | 6/1930 | Schleicher | 423/304 |
| 2,479,001 | 8/1949 | Burke et al. | 23/304 |
| 2,758,912 | 8/1956 | Dancy | 423/163 |
| 3,498,744 | 3/1970 | Frint et al. | 423/206 T |
| 3,498,745 | 3/1970 | Nylander | 423/184 |
| 3,644,102 | 2/1972 | Svanoe | 23/302 |
| 3,852,044 | 12/1974 | Neitzel et al. | 23/302 |
| 3,967,930 | 7/1976 | Sadan | 23/302 R |
| 4,039,617 | 8/1977 | Kuo | 423/186 |

*Primary Examiner*—O. R. Vertiz
*Assistant Examiner*—Wayne A. Langel
*Attorney, Agent, or Firm*—Robert J. Koch

[57] ABSTRACT

The present invention relates to a process for the production of potassium chloride and of magnesium chloride hexahydrate (bischoffite) from carnallite or from carnallite containing sodium chloride.

The process comprises heating carnallite at a temperature of between above 70° C. and above 167.5° C., in the presence of added water at the above former temperature or without added water (but preventing evaporation of water) at the above latter temperature. Solid potassium chloride is then separated. In the residual brine, carnallite is precipitated by evaporation or by lowering the temperature, and it is recycled to the starting stage. The residual solution consists essentially of magnesium chloride which is recovered as bischoffite.

11 Claims, 2 Drawing Figures

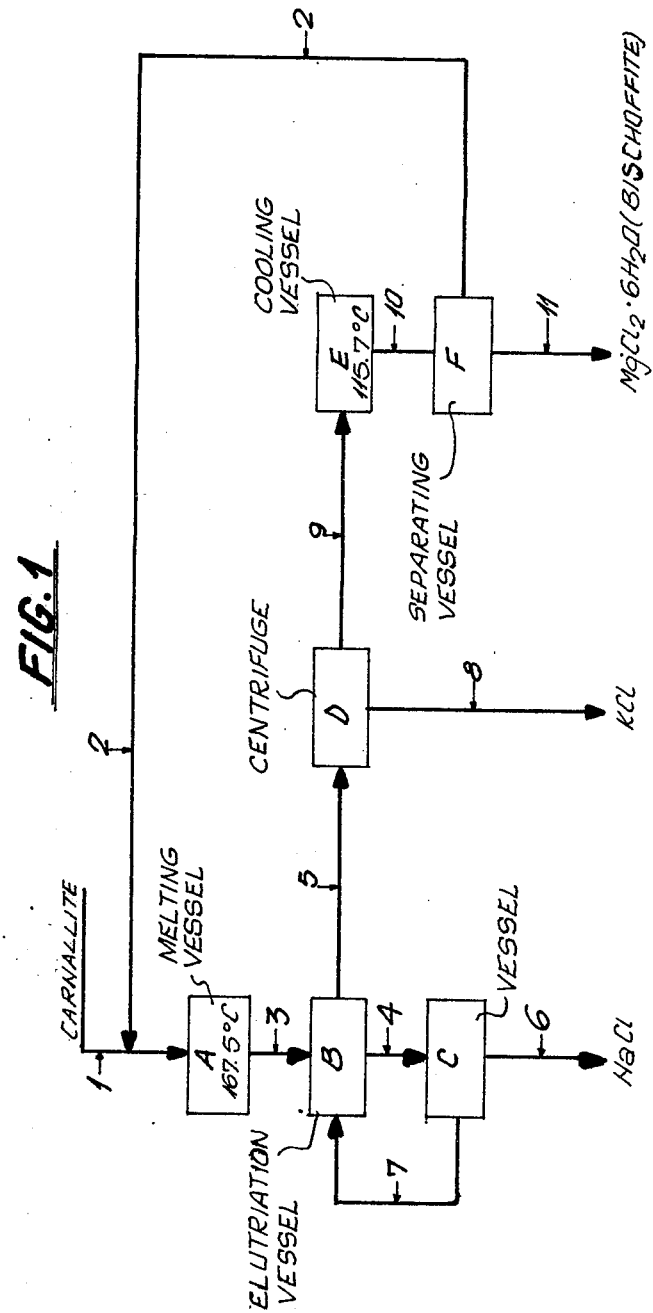

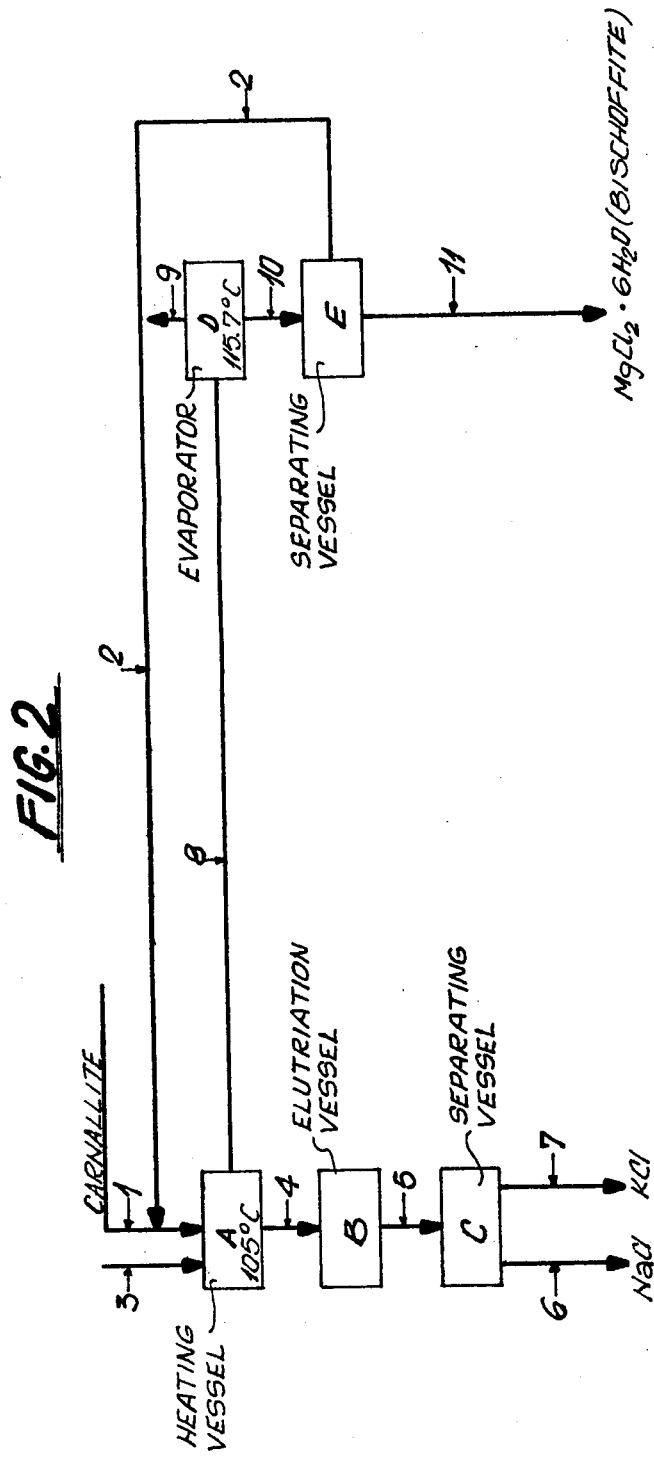

PROCESS FOR THE PRODUCTION OF POTASSIUM CHLORIDE AND MAGNESIUM CHLORIDE FROM CARNALLITE

The present invention relates to a novel process for the production of potassium chloride and of magnesium chloride hexahydrate (bischoffite) from carnallite ($KCl.MgCl_2.6H_2O$), and from mixtures of carnallite with some halite (sodium chloride). More particularly the present invention relates to a novel process characterized in that the need to evaporate large quantities of water is eliminated, and thus energy expenditure and overall expenses are substantially reduced.

Conventional processes are summarized in the article: Carnallite: The Other Potash Ore, Phosphorus & Potassium, 84, July/August 1976, published by the British Sulphur Corporation Ltd.

Hitherto carnallite is used in some parts of the world for the production of potassium chloride. The conventional process comprises decomposing carnallite with water at substantially ambient temperature so as to crystallize potassium chloride, while the magnesium chloride is obtained as solution of about 25 to 26% concentration by weight, which is separated. This solution contains generally about 3.3% potassium chloride and some sodium chloride, which is generally present in the starting material. The solution, which contains about 17% of the initial content of potassium chloride of the carnallite, is subsequently evaporated to recover such potassium chloride and magnesium chloride solution. The evaporation is quite expensive and requires either the use of fuel or the application of solar energy, where suitable conditions exist.

It is an object of the present invention to provide a simple process for the production of potassium chloride and of magnesium chloride hexahydrate (bischoffite) from carnallite. It is another object of the present invention to provide a process for the production of potassium chloride and of magnesium chloride which greatly reduces or eliminates the quantity of water to be evaporated, and thus requires less fuel than in the conventional process.

In its general aspect the process comprises dissolution of the carnallite components (possibly together with halite, if such is present in the starting material) in its water of crystallization or preferably together with a small amount of additional water, so that at a temperature of at least 70° C., the carnallite will be decomposed.

According to a preferred embodiment the carnallite is used as such, and in this case it is heated to a temperature of above 167.5° C. in a closed vessel — which avoids evaporation of water — thus resulting in a decomposition of said mineral in its water of crystallization, producing a solid potassium chloride possibly together with sodium chloride, (sylvinite) and a hot brine. It is possible to separate the solid potassium chloride from the solid sodium chloride by elutriation due to the difference in particle size. The hot brine contains about 8.2% potassium chloride and about 42.3% magnesium chloride. This hot brine is cooled, for example, by flash evaporation, to about 115° C. so as to crystallize out the potassium chloride in the form of carnallite which is separated and returned to the carnallite feed. The cooling of the hot brine can also be carried out by direct contact with the cold carnallite feed, thus obtaining also a preheating of the entering carnallite. The solution from which the carnallite was removed contains less than 1 percent of potassium chloride and about 46.1% magnesium chloride and consists substantially of bischoffite, i.e. $MgCl_2.6H_2O$. This may be processed by conventional means to yield prilled magnesium chloride hexahydrate, magnesia or magnesium metal. It is clear that the process of the invention results in two main valuable products: potassium chloride and magnesium chloride which are marketable products.

When the starting carnallite material contains sodium chloride, as is the case with material obtained from the Dead Sea, the sodium chloride precipitates with the potassium chloride and it can be separated by conventional processes such as flotation or hot leaching. When coarse carnallite is used as starting material, it is possible to elutriate the fine potassium chloride from the coarser sodium chloride. A further possibility is the separation of the halite from the carnallite prior to processing by gravity separation as the specific gravity of halite and carnallite are 2.16 and 1.6 respectively, and that of the brine is about 1.34.

According to another embodiment the process can also be effected with carnallite, possibly containing some halite, at temperatures of above 70° C., in the presence of some additional water. The higher the temperature, the lower is the quantity of water which is required to be added. For example, it is possible to decompose the carnallite at a temperature of 105° C., adding per 1156 kg. carnallite, containing also 116 kg. sodium chloride, an amount of 463 kg. water. At 70° C., the amount of water to be added should be 585 kg. for a complete decomposition of the same carnallite. The amounts of water required to be added are compiled according to the solublities data of the system: magnesium chloride — potassium chloride — sodium chloride. Above 167.5° C., no water has to be added at all, as the water of crystallization of the carnallite are sufficient to obtain the adequate melt. There is thus obtained a slurry of sylvinite in a solution of carnallite. The solids are separated and the resulting solution is evaporated at about 120° C. to give a slurry of carnallite and a melt of bischoffite. The carnallite is recirculated to the decomposition vessel, and the bischoffite is processed to result in any desired magnesium product. The sylvinite is separated by conventional means to give potassium chloride and sodium chloride.

A person skilled in the art will select the proper embodiment, according to the available facilities and commodities.

FIG. 1 of the enclosed drawings is a block diagram illustrating one embodiment of the process according to the present invention. Carnallite is fed via conduits 1 and 2 to the melting vessel A where it is heated to above 167.5° C. The carnallite contains some halite (NaCl), and in the vessel, there is obtained a slurry of sylvinite and a solution of carnallite. The slurry and solution are passed via conduit 3 to the elutriation vessel B where the fine potassium chloride is elutriated from the coarser sodium chloride, the sodium chloride is passed via conduit 4 to vessel C, from where it is removed via 6 to the outside. Part of the mixture is recycled through stream 7 to the elutriation vessel B. The potassium chloride resulting from the vessel B is conveyed through conduit 5 to the centrifuge D and removed via conduit 8. The hot solution is passed via conduit 9 to the cooling vessel E where the temperature is reduced to about 115.7° C. The solution is further conveyed via conduct 10 to the vessel F from where the separated carnallite is recirculated to the vessel A via conduit 2 while the bischoffite is removed via conduit 11 to provide a melt of bischoffite. As an alternative the magnesium chloride hexahydrate can be flaked or prilled.

The materials flow of this embodiment of the process is illustrated in Table 1, the calculation being based on a content of 100 kg. magnesium in the final bischoffite product. Analysis of the streams are given in Table 2.

A further embodiment of the invention, based on a temperature of about 105° C., to which carnallite is heated in the presence of an additional amount of 463 kg. water per 1272 kg. of carnallite, is illustrated with reference to the attached FIG. 2. Carnallite (containing some halite) is fed via conduit 1 and 2 to the vessel A. In the same vessel, water is added through stream 3, and the vessel is heated to about 105° C. A slurry of sylvinite and a solution of carnallite are obtained. The slurry and solution are passed via conduit 4 to the vessel B for the sylvinite separation. The sylvinite going out through conduit 5 is separated by conventional means in stage C to give sodium chloride (stream 6) and potassium chloride (stream 7). The hot solution separated from vessel A, is conveyed through conduit 8, to stage D where water is evaporated (conduit 9) and carnallite is crystallized. The slurry obtained is conveyed through stream 10 to vessel E where the crystallized carnallite is separated and recycled via conduit 2 to the vessel A, while the bischoffite is removed via conduit 11. As an alternative, the magnesium chloride hexahydrate can be flaked or prilled. The materials flow for this embodiment is given in Table 3.

The process of the present invention will be further illustrated by the following Example. However, it ought to be understood that the Figures, Tables and Example are illustrations only, and the present invention is by no means restricted to the preferred illustrated embodiments.

EXAMPLE 1

A quantity of 1000 g. of a dry carnallite/halite mixture (comprising $KCl.MgCl_2.6H_2O$ + NaCl) of the following composition (in weight-%): NaCl: 9.09; KCl: 24.41; $MgCl_2$: 31.12, $H_2O$: 35.38 was heated to 170° C. for one hour in a closed vessel thus preventing evaporation of water. The resulting slurry was separated from the hot solution by decantation. The solution was analysed and found to consist of (weight-%): NaCl: 1.34; KCl: 8.24; $MgCl_2$: 42.31, $H_2O$: 48.11.

The solids recovered were sylvinite, i.e. a mixture of sylvite (KCl) and halite (NaCl), of the composition: KCl: 73.33, NaCl: 26.67. The solution was cooled by flash evaporation to 116° C. upon which solids separated. The solution was analyzed and found to consist of (weight-%): NaCl: 0.63; KCl: 0.86; $MgCl_2$: 46.10, $H_2O$: 52.41 and thus this is seen to be essentially bischoffite ($MgCl_2·6H_2O$), with minor admixtures of sylvite and halite. The solids were found to consist of (weight-%): NaCl: 3.09; KCl: 26.10; $MgCl_2$: 33.15; $H_2O$: 37.67, which is essentially carnallite containing a small amount of halite.

It should also be recognized that in order to obtain a product of high purity, conventional washing procedures, although not specifically mentioned in the present specification, will generally be required to remove the entrained solution from the crystal crop.

TABLE 1

Materials flow for Bischoffite, Potash and Sodium Chloride Production
Basis: in kg per 100 kg magnesium in bischoffite product.

| Ord. No. | Stream | Composition of solids (in kg) | | | | | Composition of solutions (in kg) | | | | | TOTAL |
|---|---|---|---|---|---|---|---|---|---|---|---|---|
| | | KCl | NaCl | $MgCl_2$ | $H_2O$ | Sub-total$_1$ | KCl | NaCl | $MgCl_2$ | $H_2O$ | Sub-total$_2$ | (subtotal$_1$+subtotal$_2$) |
| 1. | Carnallite feed | 310 | 116 | 396 | 450 | 1272 | | | | | | 1272 |
| 2. | Carnallite precipitate | 93 | 11 | 118 | 134 | 356 | | | | | | 356 |
| 3. | Melter feed | 403 | 127 | 514 | 584 | 1628 | | | | | | 1628 |
| 4. | Molten carnallite | 303 | 110 | | | 413 | 100 | 16 | 514 | 585 | 1215 | 1628 |
| 5. | Potassium chloride slurry | 303 | | | | 303 | 100 | 16 | 514 | 585 | 1215 | 1518 |
| 6. | Carnallite solution | | | | | | 100 | 16 | 514 | 585 | 1215 | 1215 |
| 7. | Potassium chloride | 303 | | | | 303 | | | | | | 303 |
| 8. | Sodium chloride slurry | | 110 | | | 110 | 10 | 2 | 51 | 58 | 121 | 231 |
| 9. | Carnallite solution | | | | | | 10 | 2 | 51 | 58 | 121 | 121 |
| 10. | Sodium chloride | | 110 | | | 110 | | | | | | 110 |
| 11. | Carnallite slurry | 93 | 11 | 118 | 134 | 356 | 7 | 5 | 396 | 450 | 858 | 1214 |
| 12. | Bischoffite melt | | | | | | 7 | 5 | 396 | 450 | 858 | 858 |
| 13. | Bischoffite | 7 | 5 | 396 | 450 | 858 | | | | | | 858 |

TABLE 2

Typical Analysis for Material Balance
(in weight per cent)

| Stream name | Stream No. | KCl | NaCl | $MgCl_2$ | $H_2O$ |
|---|---|---|---|---|---|
| Carnallite feed | 1 | 24.41 | 9.09 | 31.12 | 35.38 |
| Carnallite solution (167.5° C.) | 6 | 8.24 | 1.34 | 42.31 | 48.11 |
| Bischoffite solution (115.7° C.) | 12 | .86 | .63 | 46.10 | 52.41 |
| Sylvinite in carnallite melt | 4 | 73.33 | 26.67 | — | — |
| Carnallite precipitate | 2 | 26.12 | 3.09 | 33.15 | 37.64 |

Slurry densities in solids to slurry wt %

| | Stream | | |
|---|---|---|---|
| Stream No. | 4 | Sylvinite slurry | 25 |
| Stream No. | 8 | Sodium chloride slurry | 48 |
| Stream No. | 5 | Potash slurry | 20 |
| Stream No. | 11 | Carnallite slurry | 29 |

TABLE 3

Materials flow for bischoffite, potash and sodium chloride production
(Basis: in kg. per 100 kg magnesium in bischoffite product)

| Stream | Composition of solids (in kg) | | | | | Composition of solutions (in kg) | | | | | Total |
|---|---|---|---|---|---|---|---|---|---|---|---|
| | KCl | NaCl | $MgCl_2$ | $H_2O$ | Sub Total$_1$ | KCl | NaCl | $MgCl_2$ | $H_2O$ | Sub Total$_2$ | (subtotal$_1$+subtotal$_2$) |
| 1. Carnallite feed | 310 | 116 | 396 | 450 | 1272 | | | | | | 1272 |
| 2. Carnallite precipitated | 105 | 31 | 134 | 153 | 423 | | | | | | 423 |
| 3. Decomposition feed | 415 | 147 | 530 | 603 | 1695 | | | | | | 1695 |
| 4. Decomposition product | 303 | 110 | | | 413 | 111 | 36 | 530 | 1066 | 1743 | 2156 |
| 5. Potassium chloride | 303 | | | | 303 | | | | | | 303 |
| 6. Carnallite solution | | | | | | 111 | 36 | 530 | 1066 | 1743 | 1743 |

TABLE 3-continued

Materials flow for bischoffite, potash and sodium chloride production
(Basis: in kg. per 100 kg magnesium in bischoffite product)

| Stream | Composition of solids (in kg) | | | | | Composition of solutions (in kg) | | | | | Total (subtotal$_1$+subtotal$_2$) |
|---|---|---|---|---|---|---|---|---|---|---|---|
| | KCl | NaCl | MgCl$_2$ | H$_2$O | Sub Total$_1$ | KCl | NaCl | MgCl$_2$ | H$_2$O | Sub Total$_2$ | |
| 7. Water | | | | 463 | 463 | | | | | | 463 |
| 8. Sylvinite | 303 | 110 | | | 413 | | | | | | 413 |
| 9. Water vapours | | | | 463 | 463 | | | | | | 463 |
| 10. Sodium chloride | | 110 | | | 110 | | | | | | 110 |
| 11. Bischoffite melt | | | | | | 7 | 5 | 396 | 450 | 858 | 858 |
| 12. Bischoffite | 7 | 5 | 396 | 450 | 858 | | | | | | 858* |

*Contains 100 kg. magnesium metal

What is claimed is:

1. A process for producing potassium chloride and magnesium chloride hexahydrate from a potassium and magnesium containing material which is carnallite or a mixture of carnallite and sodium chloride which comprises the steps of:
    (a) heating the mineral to a temperature of above 167.5° C. under conditions which prevent evaporation of water to obtain a slurry comprising solid potassium chloride in a brine solution containing $Mg^{++}$, $K^+$, and $Cl^-$ ions,
    (b) separating the solid potassium chloride from the brine solution;
    (c) lowering the temperature of the brine solution sufficiently to form a mixture of precipitated carnallite in an aqueous magnesium chloride solution, the composition of which is essentially that of magnesium chloride hexahydrate; and
    (d) separating the precipitated carnallite from said magnesium chloride hexahydrate.

2. The process as defined in claim 1, wherein the heating of carnallite is carried out under elevated pressure.

3. The process as defined in claim 2, wherein the temperature is lowered by means of flash evaporation.

4. The process as defined in claim 1, wherein the temperature of the brine solution is lowered to about 116° C. after separation from the potassium chloride, to form the mixture of precipitated carnallite in the magnesium chloride solution.

5. The process as defined in claim 4, wherein the temperature of the brine solution is lowered by direct contact with cold carnallite.

6. The process as defined in claim 1, wherein the starting material comprises carnallite and sodium chloride and the slurry obtained in step (a) comprises solid potassium chloride and solid sodium chloride and which further comprises the steps of separating a mixture of solids comprising potassium chloride and sodium chloride from the brine solution and separating the solid potassium chloride from the solid sodium chloride.

7. The process as defined in claim 6, wherein the solid potassium chloride is separated from solid sodium chloride by elutriation.

8. The process as defined in claim 1 which further comprises the step of recycling the carnallite which is separated in step (d) into the heating step (a).

9. The process as defined in claim 1, wherein the starting mineral is a mixture comprising carnallite and halite and which further comprises the step of subjecting the mineral mixture to a gravity separation in order to remove a substantial portion of the halite therefrom.

10. A process for producing potassium chloride and magnesium chloride hexahydrate from a potassium and magnesium containing mineral which is carnallite or a mixture of carnallite and sodium chloride which comprises the steps of:
    (a) heating the mineral to a temperature of from about 70° to 167.5° C. in the presence of an amount of water of between about 51 and zero parts by weight per 100 parts by weight of carnallite, which amount of water is sufficient to obtain a slurry of potassium chloride in a brine solution containing Mg;
    (b) separating the potassium chloride from the brine solution,
    (c) evaporating water from the brine solution to obtain a mixture of precipitated carnallite in a magnesium chloride containing solution;
    (d) separating the precipitated carnallite from the mixture; and
    (e) recovering magnesium chloride hexahydrate from the magnesium chloride solution.

11. The process as defined in claim 10, which further comprises the step of recycling the carnallite which is separated in step (d) into the heating step (a).

* * * * *